United States Patent [19]

Kocher et al.

[11] 4,083,629
[45] Apr. 11, 1978

[54] BEAM SPLITTING SYSTEM FOR A WELDING LASER

[75] Inventors: Robert C. Kocher, Harvard; Alfred Piorkow, Sudbury, both of Mass.

[73] Assignee: GTE Laboratories Incorporated, Waltham, Mass.

[21] Appl. No.: 745,737

[22] Filed: Nov. 29, 1976

[51] Int. Cl.² .......................................... G05D 25/00
[52] U.S. Cl. ................................. 350/285; 219/121 L
[58] Field of Search ................... 219/121 L, 121 LM; 331/94.5, DIG. 1; 350/6, 7, 169–171, 285, 273

[56] References Cited

U.S. PATENT DOCUMENTS

| | | | |
|---|---|---|---|
| 3,463,898 | 8/1969 | Takaoka et al. | 350/171 X |
| 3,534,462 | 10/1970 | Cruickshank et al. | 219/121 LM X |
| 3,622,740 | 11/1971 | Ravussin et al. | 219/121 L |
| 3,851,974 | 12/1974 | Ravussin et al. | 331/DIG. 1 X |
| 3,993,402 | 11/1976 | Fredrick, Jr. | 350/285 |

FOREIGN PATENT DOCUMENTS

| | | | |
|---|---|---|---|
| 1,765,145 | 5/1973 | Germany | 219/121 LM |
| 1,405,487 | 9/1975 | United Kingdom | 219/121 L |

OTHER PUBLICATIONS

Murray, Western Electric Technical Digest, No. 15, July 1969, pp. 33 and 34.

*Primary Examiner*—F. L. Evans
*Attorney, Agent, or Firm*—Robert A. Seldon; Fred Fisher

[57] ABSTRACT

A beam splitting system for use with a welding laser and having means for distributively directing an incoming welding beam along a pair of output optical paths is disclosed whereby a single welding laser may weld either sequentially or simultaneously at a pair of spatially-separated weld sites. For sequential welding, a bimodal beam switch is provided for alternatively switching the weld beam between a pair of alternate optical paths. For simultaneously welding, the bimodal beam switch is replaced by a dielectric beam splitter which divides the beam into transmitted and reflected beams simultaneously propagated along the pair of output optical paths.

3 Claims, 6 Drawing Figures

BEAM SPLITTING SYSTEM FOR A WELDING LASER

FIELD OF THE INVENTION

This invention relates to welding devices and, more specifically, to laser welders. The principles of laser welding are well known in the art and a variety of such welders have been available for use in industrial environments for many years. In contrast to conventional welding equipment, laser welders are simple to operate. Control over the laser pulse shape and width enables an operator, with minimum training, to weld, drill, trim, or cut. It should be noted that the term "weld" throughout the disclosure should be construed to include the foregoing operations.

Laser welders generally comprise a power supply, a control panel, a laser head for generating a welding beam comprising a series of laser pulses, and a beam-focussing head containing the focussing optics through which the generated pulses pass.

Laser welders are inherently ideal for automated processes of the type wherein component parts are automatically oriented and assembled at a first station and transferred to a second station by a synchronized transfer mechanism. The component-assembling machinery may be readily adapted to generate a laser-triggering signal, subsequent to the properly oriented transfer of the components, to timely initiate the welding beam.

A detailed description of automated assembly processes is beyond the scope of the present application, although it may be readily appreciated that a high product output rate is necessary to economically justify the use of such a process. Accordingly, it is generally desirable to perform a plurality of operations at each station and thereby decrease the total transfer time and correspondingly increase the product output rate. Additionally, the elimination of component manipulation will reduce the chances of jamming of the automated equipment and simplify the component-handling mechanisms associated therewith.

SUMMARY OF THE PRIOR ART

With specific attention to laser welding, automated assembly processes conventionally employ one of several methods when the assembled components required a plurality of welds to be made. A pair of components are conventionally brought together, in a properly oriented manner, at a first station located under the welder's beam-focussing head, the weld made, and the two components transferred to a second station for mating with a third component under the focussing head of a second welder. Alternately, the two welded components were manipulated under the first-focussing head and joined with a third component thereunder. Another method includes the re-positioning of the laser head subsequent to the first weld to eliminate the re-orientation of the first two components.

All of these methods have associated problems in addition to the detraction of the re-orientation and transfer times from the output rate. The use of two welders in the first process requires a substantial capital investment which significantly reduces the attractiveness of automating many assembly processes. The second method tends to require complex handling mechanisms. The third requires the complex and accurate re-positioning of a relatively large mass and typically requires refocussing of the laser head.

SUMMARY OF THE INVENTION

In brief, the invention described herein is a beam splitting system for use with a laser welder which is responsive to a trigger signal, such as that generated by an automated assembly mechanism to indicate the properly oriented transfer and abuttment of components to be joined. The trigger signal may additionally be the signal which fires a pulsed laser or alternatively the signal which controls the shutter of a CW laser to emit a pulse-shaped beam.

The beam splitting system comprises housing means coupled to the welding laser and disposed about the output beam path thereof, beam splitting means within the housing means for distributively directing the welding beam along a pair of output optical paths; and first and second beam focussing means respectively located in a different one of the output optical paths for independently focussing the pulses propagating therealong at a respective one of a pair of spatially separate weld sites.

In one embodiment, the beam splitting means includes a bimodal switching means responsive to successive laser trigger signals for deflecting a predetermined number of pulses between alternate output paths, whereby the laser welder sequentially welds at the two weld sites.

In another embodiment, the beam splitting means includes means for dividing the weld beam into simultaneous transmitted and reflected pulses respectively propagated along one of the output optical paths, whereby the welder simultaneously welds material at the two weld sites.

The invention will be more particularly described in the following description of the preferred embodiment, of which the following drawing will be a part.

DESCRIPTION OF THE PREFERRED EMBODIMENT

Figure 1:
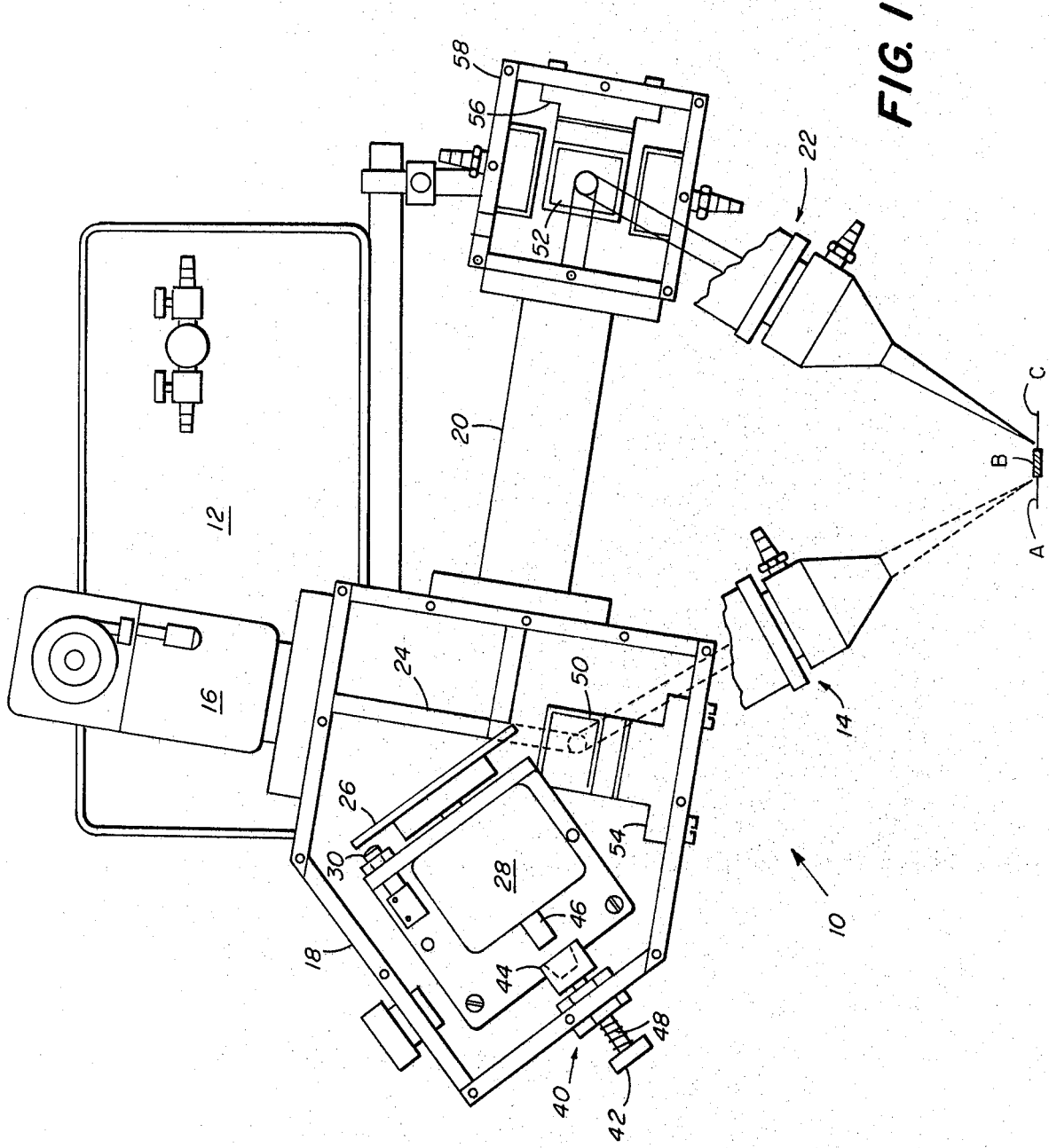
FIG. 1 is an elevation view of a beam splitting system constructed in accordance with the invention and coupled to a conventional welding laser.

FIG. 1 is an illustration of a beam splitting system 10 constructed in accordance with the invention and affixed to a conventional welding laser between the laser head 12 and the beam-focussing head 14. As will be apparent from the following text, the beam splitting system may be coupled to the welding laser in a number of ways; the configuration illustrated is preferable, however, since the use of the welder's beam-focussing head at one of the beam-splitting system outputs reduces the cost of the unit and simplifies construction.

The beam splitting system 10 described herein splits the output of a single pulsed YAG laser, such as the Sylvania Model 1610, to perform two separate welds. By way of example, a three-piece weld is illustrated wherein wires A and C, which may respectively be a lamp lead and a filament support are to be welded to an element B, which may be the central conductor of a glass-to-metal seal which will eventually couple the lead and filament through the lamp envelope.

For purposes of illustration, it will be assumed that the leads A and C and the conductor B are automatically manipulated into their proper orientation by any one of a number of automated assembly mechanisms known in the art, although for the sake of clarity, the mechanism is not shown. The laser welder is capable of being fired on command from the parts transport mechanism to synchronize the welding operation with the wire cutting and handling cycles.

The embodiment illustrated in FIG. 1 is adapted to alternately weld the wire A and the conductor B, and the conductor B and the wire C, by alternately switching the laser pulses between two optical paths and independently focussing the laser pulses onto each end of the central conductor B to produce two sequential welds. The beam splitting system comprises a housing 18 adapted to directly replace the focussing head 14, by screwing into the beam expander/viewing optics package 16, and to accept the focussing head 14 at one of its outputs. The beam splitting system further comprises a beam guide 20 disposed about the alternate optical path, and between the housing 18 and the beam-entering side of a prism housing 58. A second beam-focussing head 22 includes beam focussing optics lying in the alternate output path and is located at the beam-exiting end of the prism housing 58.

As will be explained below, the pulses from the laser head 12 are divided between the two paths so that a predetermined number of pulses will travel along the first path and through the focussing head 14 to be focussed at the site where the wire A is abutting the element B. A second predetermined number of pulses will subsequently be directed along the second optical path and through the beam focussing head 22 to be focussed at the site where the element B abuts the wire C.

Figure 2:
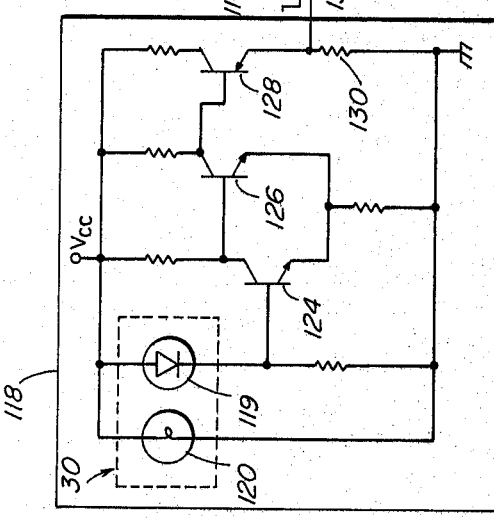
FIG. 2 is a view of a chopper wheel forming part of the bimodal beam switch in the beam splitting system of FIG. 1.
Figure 2:
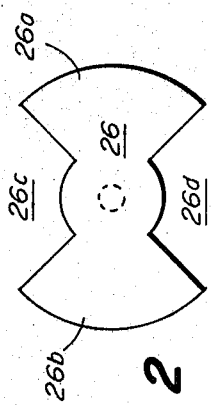

In the described embodiment, a bimodal beam switch synchronized with the trigger signal generated by the automated assembly device is arranged to alternately switch each successive pulse along a different output path. The incoming welding beam pulses 24 from the beam expander 16 of the laser head 12 is shown striking a motor-driven chopper wheel 26 having a bow-tie shape as shown in FIG. 2. The chopper wheel 26 is coated with a dielectric film to be highly reflective at the laser wavelength. It may be appreciated that the rotation of the radially extending surfaces 26a and 26b of the chopper wheel 26 through the beam path 24 will periodically deflect the beam 24 through the beam guide 20 while the cut-out sectors 26c, 26d will allow the beam 24 to pass through to a prism 50. The chopper wheel, which thereby functions as a bimodal beam switch, provides two complete switching cycles per revolution of motor 28. The wheel shape was chosen for balance and to minimize vibration. A multitude of wheel shapes could be alternatively utilized, including wheels having transmissive regions in place of the cut-out sectors 26c and 26d, or refractive instead of reflective surfaces. These are all within the purview of the invention. The alternate transmissive and reflective modes of the bimodal beam switch are synchronized with the emergence of successive laser pulses from the beam expander 16 by controlling the rotational speed of the chopper wheel 26 via the voltage driving the motor 28. The technique utilized herein is similar to phase-lock tuning circuits wherein a voltage-controlled variable frequency oscillator is responsive to a feedback signal related to its phase difference with a reference oscillator.

Accordingly, a feedback signal, indicative of the switch mode, is derived from a scanner 30 comprising a self-contained light source 120 and solid state photodetector 119 mounted just above the servo-motor 28. The scanner 30 detects the position of the wheel via the presence and absence of reflected light.

The occurrence times of the scanner 30 pulse and laser trigger signal are compared by a phase comparator, more particularly described with reference to FIG. 3, which generates a "phase-lead" or "phase-lag" signal to respectively speed up or slow down the servomotor 28.

Figure 3:
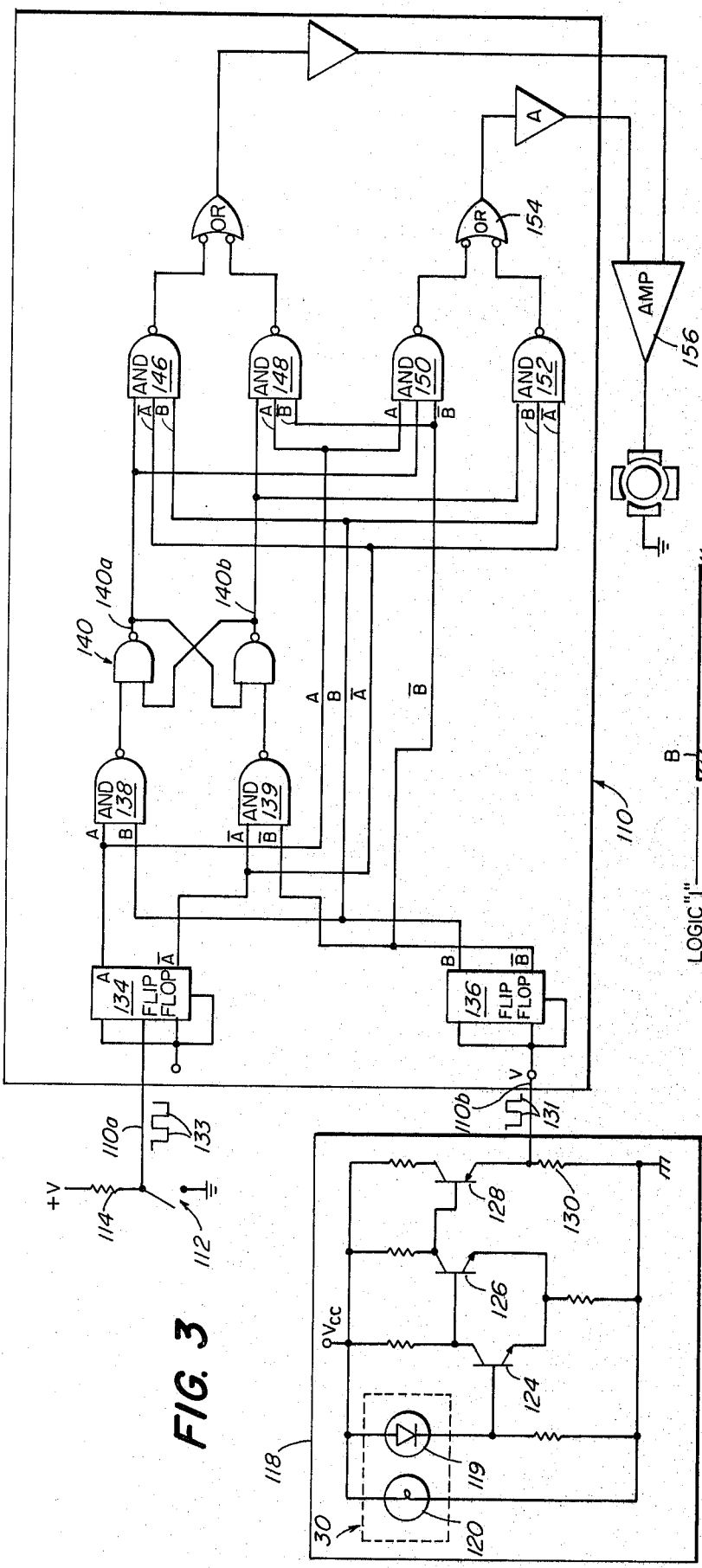
FIG. 3 is a simplified schematic diagram of a circuit utilized to synchronize the bimodal beam switch of FIG. 1 with the laser trigger signal.

FIG. 3 is a block diagram of a circuit utilized to synchronize the beam switch with the laser trigger signal. Prior to a more detailed description, the circuit of FIG. 3 may be seen to comprise an oscillator 118 responsive to the scanner 30 to generate a signal 131 indicative of the mode of the beam switch. The signal 131 is coupled to one input 110b of a phase comparator 110. Coupled to the other input 110a of the phase comparator 110 is a signal 133 generated by the automatic assembling device to trigger the welding laser. As a practical matter, the signal 133 will normally be represented by a contact closure within the assembly device which is outputted, for the sake of reliability, by means of both a normally closed and a normally opened contact pair. Additionally, the signal 133 may also be present as a pulse shaped signal generated by the automated assembly device. In either case, the signal may be incompatible with the phase comparator 110 circuitry and it may, therefore, be desirable to include input conditioning circuitry to eliminate the effects of contact bounce and convert the input signals to appropriate levels. Since these conditioning circuits are well known in the art and any explanation of them is beyond the scope of the present disclosure, a properly conditioned input signal representative of a trigger signal will be assumed, and is illustratively shown as being derived from the momentary closure of a pair of normally open contacts 112 coupled between ground and voltage source of +V through current limiting-resistor 114.

While the first input 110a of the phase comparator 110 is thereby responsive to the occurrence time of laser firing, its second input 110b is coupled to the scanner 30 via a pulse generating circuit 118 responsive to the occurrence times of the beam switch mode changes. The light source 120 and photodiode 119 of the scanner 30 may be conveniently positioned as shown in FIG. 1 so as to be optically coupled via the reflective surface of the chopper wheel as it rotates through the incoming welding beam.

In operation, the scanner circuit 118 generates a digital signal indicative of the switch mode. The photodiode 119 becomes electrically conductive when optically coupled with the light source 120 to turn on a first NPN transistor 124 essentially shunting its collector to ground. A second NPN transistor 126, having its base terminal connected to the collector of transistor 124, is thereby turned off, opening its collector-emitter circuit and consequently energizing a PNP transistor 128 having its base connected to the collector of transistor 126. Since the emitter of the transistor 128 is coupled to ground through an emitter resistor 130, the output signal 131 is thereby "LO" when the photodiode 119 and light source 120 are optically coupled. Conversely, when the chopper wheel 26 (FIG. 2) is rotated sufficiently so that the photodiode 119 and light source 120 are no longer coupled, the photodiode 119 ceases conducting and turns the transistor 124 off, open-circuiting its collector-emitter circuit and permitting the injection of base current into the transistor 126. The transistor 126 is thereby turned on and its collector is essentially shunted to ground, turning the transistor 128 on. The collector-emitter circuit of the transistor 128 thereby conducts current from the source $V_{cc}$ to ground through the emitter resistor 130, thereby raising the voltage level of the collector to the "HI" signal level. Consequently, a switch mode signal 131 will comprise a series of alternate "HI" and "LO" pulses phase-related to the beam switch modes.

The phase comparator, shown generally at 110, may be analytically divided into four stages. First a pair of input flip-flops 134, 136 are respectively responsive to the laser trigger signal 133 and the scanner pulse 131 to generate a logic-level signal. As is known in the art, the output A of flip-flop 134 will undergo a logic-level change, such as from "0" to "1" with the ground-going transition of the laser trigger signal. The $\bar{A}$ output will simultaneously change from the "1" to "0" level. Similarly, the outputs B and $\bar{B}$ of flip-flop 136 will undergo a logic-level change in response to the ground-going pulse emitted by the scanner circuit 118.

The second stage of the phase-comparator 110 comprises a pair of AND gates 138, 139. The AND gate 138 is responsive to the outputs A and B of flip-flops 134 and 136 to generate a unique logic output level when both input signals A and B are logic "1". Similarly, the AND gate 139 generates a unique logic level output when its input signals $\bar{A}$ and $\bar{B}$ are at logic "1". As is known in the art, the signals $\bar{A}$ and $\bar{B}$ are at logic "1" when the signals A and B are at logic "0". The change in the output logic level of the AND gates 138 and 139 therefore signify the simultaneous presence of both a scanner pulse 131 and a laser trigger signal 133.

The third stage of the phase-comparator 110 is an inverting latch circuit 140 which serves to invert the logic level output of the AND gates 138 and 139 for utilization by the hereinafter described fourth stage. Additionally, the inverting latch circuit 140 maintains its output logic level until both of the flip-flops 134, 136 are triggered by the next succeeding pulse. As will become clearer with reference to the fourth stage, the latch circuit 140 thereby acts as a memory to indicate the lastly held logic-level commonly shared by the flip-flops 134, 136. For example, when the outputs A and B have acquired the logic "1" level, the output 140a of the latch circuit 140 will be at logic "1". Conversely, when the outputs $\bar{A}$ and $\bar{B}$ are at logic level "1", and the outputs A and B at logic level "0", the output 140b will be at the logic "1" level. Owing to its latching characteristics, the latch circuit 140 will maintain its output logic level until the outputs of both flip-flops 134 and 136 have changed state again.

The fourth stage of the comparator 110 comprises four three-input AND circuits 146, 148, 150 and 152.

Figure 4:
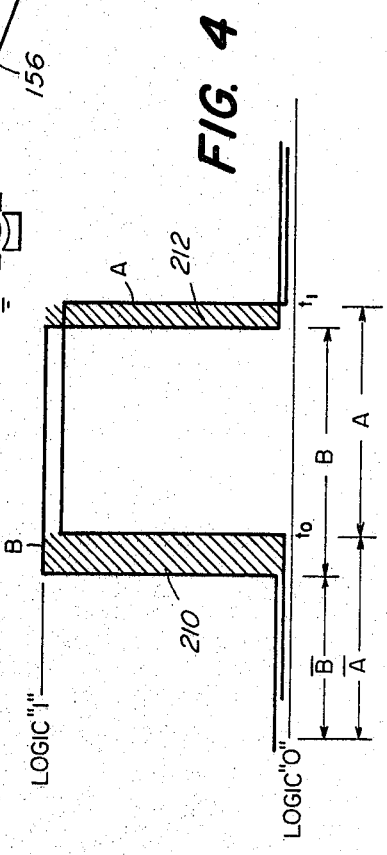
FIG. 4 is a waveform diagram which is useful in describing the operation of the circuit in FIG. 3.

The operation of this fourth stage is most easily understood in conjunction with FIG. 4 which illustrates a leading scanner pulse 131 superimposed on a laser trigger signal 133. The output B of flip-flop 136 is shown leading the output A of flip-flop 134. The output A changes from "0" to "1" at $t_0$ when the laser trigger signal is detected by the flip-flop 134 input. At $t_1$, the next successive laser trigger signal is detected and the output A returns to the "0" level, the condition being algebraically represented in FIG. 4 by the nomenclature A. Output B is similarly related to the scanner circuit pulse and similarly represented graphically. The time intervals of interest, represented by areas 210 and 212, represent the time phase difference between the occurrences of the laser trigger signal and the scanner pulse. These areas may be respectively represented by the Boolean operations, $\bar{A}B$ and $A\bar{B}$. Returning to FIG. 3, it may be appreciated that these two operations $\bar{A}B$ and $A\bar{B}$, are each inputted to one pair of the four AND circuits comprising the fourth stage. The AND circuit pair sharing each Boolean operative are coupled via their third input to opposite outputs of the latch circuit 140. As will become clearer in the following description, one of the pairs thereby detects lagging scanner pulses while the second detects leading scanner pulses. Although a single pair of such AND circuits could thereby be utilized to detect both lagging and leading switch modes, only one of the areas 210, 212 would be utilized to generate the corrective signal. The use of the two pair thereby permits faster synchronization of the scanner pulses with the laser trigger signal.

The operation of the phase comparator may be briefly summarized as follows with reference to FIG. 3, taken in conjunction with FIG. 4. Assuming that the outputs A and B of flip-flops 134 and 136 are initially at the "0" level, the output 140b of the latch circuit 140 will be initially at logic "1". The occurrence of the leading scanner pulse 131 will set the outputs B and $\bar{B}$ of the flip-flop 136 at "1" and "0" respectively. Since the Boolean operation $\bar{A}B$ is satisfied, the AND circuit 152 will generate a corrective signal indicative of a leading scanner pulse. The subsequent occurrence of the laser trigger signal will preclude the condition $\bar{A}$ from being satisfied, since the output $\bar{A}$ of flip-flop 134 will change from "1" to "0" state. The AND circuit 152 will accordingly cease to generate the corrective signal. Thus, the time interval during which the corrective signal is generated will be proportional to the length of time the condition $\bar{A}B$ exists. It may also be appreciated that the subsequent occurrence of the trigger signal A will also cause the output 140a of the latch circuit 140 to change to logic "1" and, conversely, the output 140b to change to logic "0". Assuming that the next succeeding scanner pulse is still leading, the output B of flip-flop 136 will change to the logic "0" state before the output A of flip-flop 134, as illustrated by the area 212 in FIG. 4 and represented by the logic operation $A\bar{B}$. It may accordingly be appreciated that the AND circuit 150 input conditions will be satisfied and an output generated therefrom indicative of a leading scanner signal.

The AND gates 150, 152 are coupled to an integrating amplifier 156 through an OR gate. The integrating amplifier 156 thereby generates a signal proportional to the time phase difference between the occurrences of the scanner and laser trigger pulses. In the preferred embodiment, the output signal from the integrating amplifier is a voltage proportional to the phase difference and is coupled to the scanner motor.

The detection control of lagging scanner pulses is similarly performed, utilizing AND circuits 146 and 148. While other circuits could be satisfactorily used to derive control signals, the illustrated circuit permits the use of efficient, conveniently packaged solid state components.

In operation, the phase comparator is designed to synchronize the motor with rotation speeds of from one to five revolutions per second.

Naturally, there are many variations and modifications to the bimodal beam switch which are obvious to one skilled in the art and are deemed to be within the scope of the invention. For example, the DC motor may be replaced by a rotary solenoid which is switched by the laser trigger signal.

Returning to FIG. 1, other features of the disclosed embodiment may be observed. In order to align and focus the two lens assemblies 14 and 22, a clutch assembly 40 located behind the motor 28 is provided having a spring loaded plunger 42 with a tapered rubber cup 44 near the rear motor shaft 46. The cup is normally disengaged from the motor shaft by the spring 48. The plunger 42 can be depressed to engage the cup 44 and shaft 46 when the motor 28 is turned off, to manually rotate the chopper wheel 26 into the described switch mode, whereby the two lens assemblies may be individually aligned and focussed.

The beam splitting system described hereinabove may be configured to weld simultaneously, rather than sequentially at the two spatially separated weld sites. Accordingly, the motor 28 and chopper wheel 26 may be accommodated by an adjustable mount within the housing 18 so as to be removable and replaced, by a dielectric beam splitter. The beam splitter, in the preferred embodiment, is a flat, polished quartz disc coated on one side with a multi-layer dielectric film and mounted within an adjustable holder in essentially the same position as the chopper wheel 26. The coating is designed to divide the laser beam equally into simultaneously propagated "transmitted" and "reflected" beams.

In either configuration, the welding beam 24 is distributively directed to the beam focussing heads 14, 22 after exiting from the beam splitter. The beam is coupled into the focussing heads 14, 22 by respective 45° prisms 50, 52, mounted in a pair of prism holders 54, 56 which turn the beam through a right angle. The entire barrel of each beam focussing head 14, 22 is supported from the respective housing 18, 58 by a tubular mount, located in a large flange, which can be rotated and is friction locked by a clamp ring on the flange. The flange is accurately centered on the laser beam axis so that the entire lens barrel and prism box can be turned to bring the beam into alignment with the desired weld location.

Figure 5:
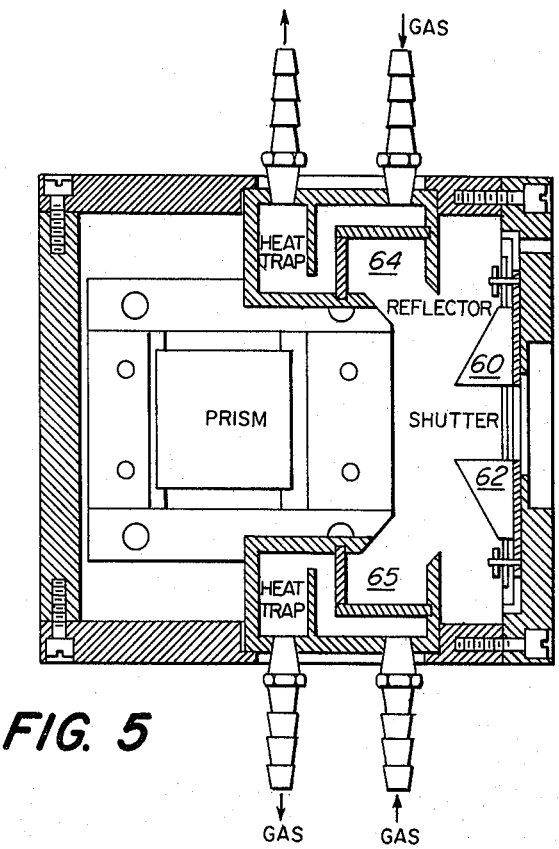
FIG. 5 is a side view of the prism housing in FIG. 1 as viewed from the beamguide.
Figure 6:
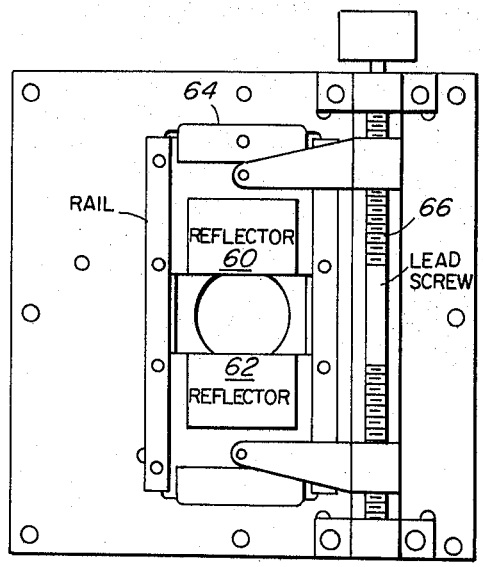
FIG. 6 is an interior view of the faceplate on the beam exiting side of the prism housing in FIG. 1.

An additional feature provided in the illustrated embodiment is the adjustable attenuation of the beam associated with the focussing head 22 by such means as a shutter assembly more clearly shown in FIGS. 5 and 6.

FIG. 5 is an elevation view of the interior of prism box 58 of FIG. 1 as viewed from the beamguide 20. FIG. 6 is a view of the shutter assembly mounted on the inner faceplate on the beam-exiting side of the prism housing. Two jaws 60, 62 of the shutter assembly, consisting of 30° prisms with highly reflected coatings on the hypotenuse faces, are mounted on a precision slide mechanism 64 and are driven symmetrically by a half-left and half-right hand threaded lead screw 66. As the welding beam passes through the center of the jaws 60, 62, a radially outward portion of the beam is reflected into and absorbed by heat trap assemblies 64, 65. The absorbing surfaces in the heat trap are pure carbon and are cooled from the nearby compressed gas. The portion of the laser beam that is transmitted by the shutter assembly remains symmetric about the center line of the jaws 60, 62, an important consideration if the location and symmetry of the focussed laser beam is to be maintained as the jaws are adjusted.

To optimize performance of the hereindisclosed beam splitter, all perpendicular optical surfaces, such as those of prisms and lenses, are anti-reflection coated. All metal surfaces have a flat black finish to prevent specular reflection of the intense infra-red laser beam. The motor, when utilized, and the prism box are made of ⅜th inch Dural to insure rigidity and optical alignment of the device. Critical parts are pinned to secure absolute location and the entire structure is designed to require an absolute minimum of adjustment by inexperienced personnel.

While the foregoing description of the preferred embodiment has been quite detailed, many modifications and variations obvious to one skilled in the art may be made. These changes are deemed to be within the scope of the present invention, which is to be defined only by the claims appended hereto.

We claim:

1. For use with a laser welder responsive to a trigger signal to generate optical welding beam pulses, a beam splitting system for enabling the welder to perform welding operations at a pair of selected welding sites, the beam splitting system including housing means coupled to the welding laser and disposed about the optical welding beam path thereof; beam splitting means within the housing means for distributively directing the incoming beam along a pair of output optical paths; and first and second beam focussing means respectively located in a different one of the output optical paths for independently focussing the pulses propagating therealong at a respective one of the site pair, the improvement wherein said beam splitting means comprises bimodal switching means synchronized with the trigger signal for switching a predetermined number of welding beam pulses between alternate output paths, whereby the laser welder sequentially welds at the two regions, said bimodal switching means includes
   a reflective surface member rotatable through the incoming pulse path to interruptingly deflect a first predetermined number of laser pulses along one output path; and
   means synchronized with the trigger signal for passing the reflective surface member across the incoming pulse path in one mode to deflect said first predetermined number of laser pulses along said one output path and removing the reflective surface member from the incoming pulse path in another mode to permit a second predetermined number of laser pulses to propagate along the second path, said synchronized means comprising
   a variable speed motor responsive to a control signal for rotating the reflective member through the pulse path; and
   control signal generating means responsive to the time phase difference between the trigger signal and the mode transition occurrence of the bimodal switching means to synchronize the interruption by the surface member with the trigger signal.

2. The beam splitting system of claim 1 wherein the reflective surface member is dielectrically coated.

3. The beam splitting system of claim 2 wherein the sites are spatially separated.

* * * * *